May 30, 1939.  E. E. WATSON  2,160,608
INDEPENDENT WHEEL SUSPENSION FOR VEHICLES
Filed April 14, 1937  2 Sheets-Sheet 1
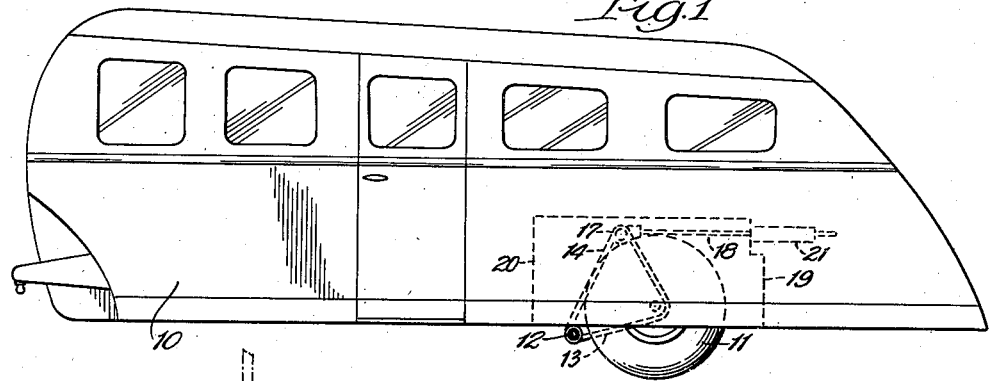
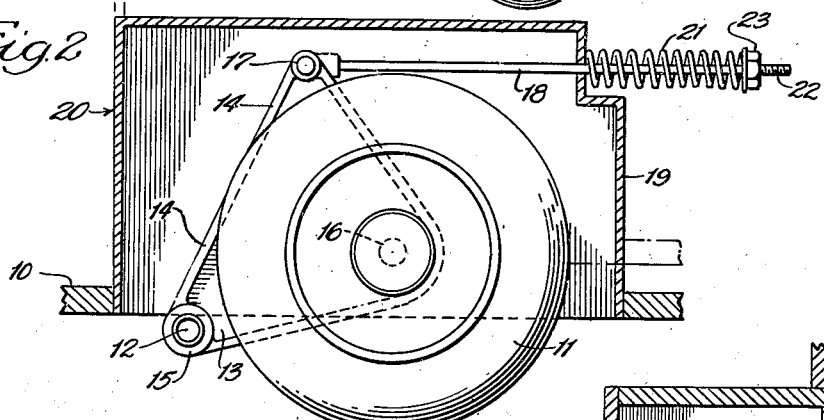
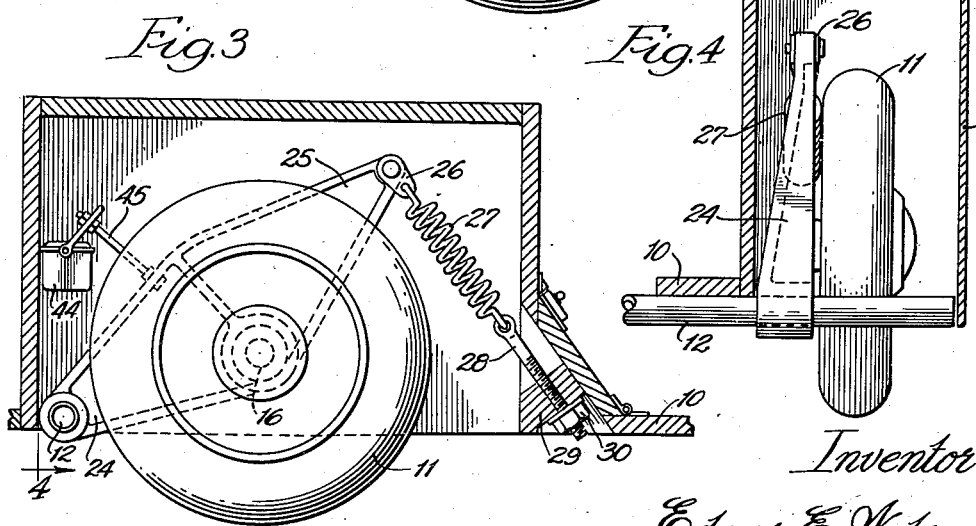
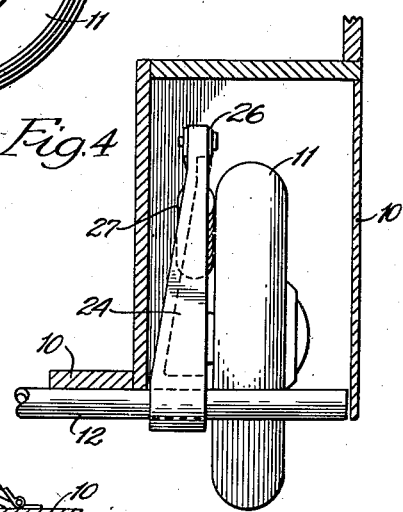
Inventor:
Edgar E. Watson,
By Enning Lanning
Attorneys May 30, 1939. E. E. WATSON 2,160,608
INDEPENDENT WHEEL SUSPENSION FOR VEHICLES
Filed April 14, 1937 2 Sheets-Sheet 2

Inventor:
Edgar E. Watson,
By Lanning & Lanning
Attorneys

Patented May 30, 1939

2,160,608

UNITED STATES PATENT OFFICE 2,160,608

INDEPENDENT WHEEL SUSPENSION FOR VEHICLES

Edgar E. Watson, Waterloo, Iowa, assignor to The Metalectric Corporation, Waterloo, Iowa, a corporation of Iowa Application April 14, 1937, Serial No. 136,767

1 Claim. (Cl. 267—19)

The mechanism of the present invention is designed particularly, though not exclusively, for use with trailers, and the objects of the invention are to provide suitable means for the mounting of the trailer wheels and which shall at the same time afford the necessary spring cushioning required for the easy riding of the trailer, and also provide means for regulating the elevation of the trailer body above the road level.

The wheel mounting furthermore provides means for reinforcing the structure of the trailer frame and for maintaining proper alignment of the wheels irrespective of their adjustment with relation to the trailer body.

Further objects and details will appear from a description of the invention in conjunction with the accompanying drawings, wherein,—

Figure 1 is a side elevation of a trailer showing one form of wheel suspension conforming to the principles of the present invention;

Fig. 2 is an enlarged elevation of the wheel suspension features of Fig. 1;

Fig. 3 is a similar view showing a modified form of construction;

Fig. 4 is a view at right angles to that of Fig. 3, taken on line 4 of Fig. 3;

Figure 5:
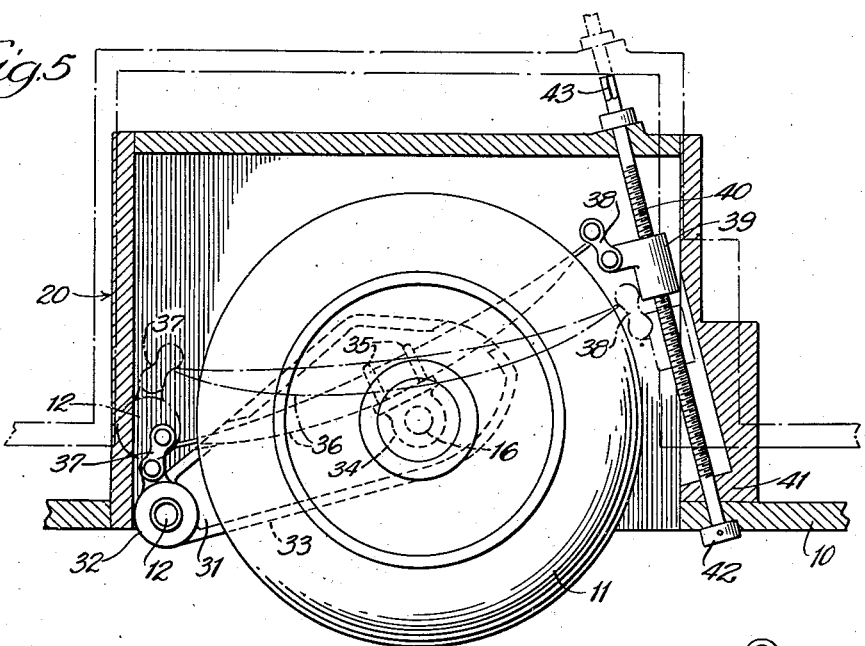
Fig. 5 is a side elevation of a further modified form of construction.

For purposes of illustration, the mechanism of the present invention is shown in association with a trailer of the usual type, comprising a body 10 built upon a framework of any suitable or approved construction. The wheels 11 are located to the rear of the center of gravity of the trailer body, and immediately in advance of the two wheels is located a transversely extending fixed shaft or rod 12 which underlies the frame or chassis of the trailer and is rigidly secured thereto in any suitable manner, and said fixed shaft constitutes a mounting for the mechanisms which support the wheels on opposite sides of the trailer.

The features above described are common to all of the modified forms of the invention hereinafter to be described in detail, but said mountings differ from one another in certain particulars, so that reference will now be made to the form of construction particularly illustrated in Fig. 2.

At each end of the fixed shaft 12 is pivotally mounted a wheel mounting 13 in the form of a triangular plate provided around its edges with reinforcing flanges 14. The forward apex of the plate 13 terminates in a boss 15 which serves as a hub or journal mounting for the plate, and at the rear apex of the plate is located an outwardly extending stub axle 16 upon which the wheel 11 is mounted and held in any suitable or approved manner.

The upper apex 17 of the wheel mounting plate has pivoted thereto a draw rod 18 which extends through the rear wall 19 of a housing 20 which lies inside of the outer side wall of the trailer body and furnishes an enclosure for the mounting of the wheel within the outer walls. The rear protruding end of the draw rod 18 is encircled by a coil spring 21, and the rod is threaded at its outer end 22 to receive an adjusting nut 23.

The weight of the trailer body, being applied to the mounting 13 behind its pivoting center upon the fixed shaft 12, will hold the spring 21 constantly under partial compression irrespective of the adjustment of the nut, which nut serves to regulate the elevation of the trailer body by adjusting the mounting plate 13 to the desired angle with respect to the trailer body, which has the effect of raising and lowering the wheel axle to the desired degree. At the same time, the spring, being under constant partial compression, will at all times serve to cushion the vertical movements of the trailer body, and the wheels, being thus independently mounted on opposite sides of the trailer, will readily adapt themselves to inequalities in the road surface, so that the trailer body will be suspended from the spring supported mounting thus afforded.

The device of Fig. 3 differs from the construction first described, in that the wheel mounting 24 is of elongated formation, with the wheel axle 16 located in the medial position near the lower edge of the mounting plate. The forward end 25 of the plate has attached thereto a clip 26 to which is secured the upper end of a tension coil spring 27, the lower end of which is secured to an adjusting rod 28 extending obliquely through a suitably positioned block or plate 29 and threaded to receive an adjusting nut 30. By adjusting the nut 30 to draw down the rod 28, the rearmost end of the wheel mounting will be lowered, which will elevate the front end of said mounting and with it the fixed shaft 12 which supports the body of the trailer, so that the elevation of the trailer body can be adjusted as desired, the tension of the spring remaining constant, however, at all times irrespective of the adjustment thus afforded, since the tension is due to the weight of the trailer body, which is thus suspended under spring tension.

Figure 6:
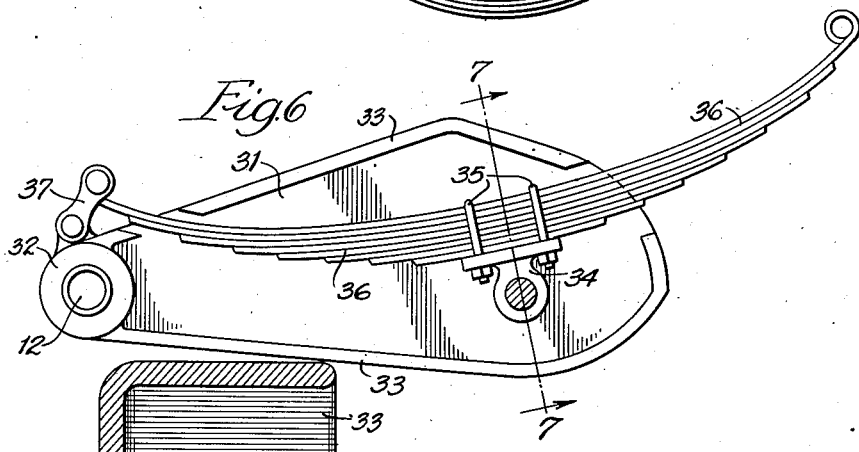
Fig. 6 is a view showing the spring mounting and associated parts of the construction illustrated in Fig. 5.
Figure 7:
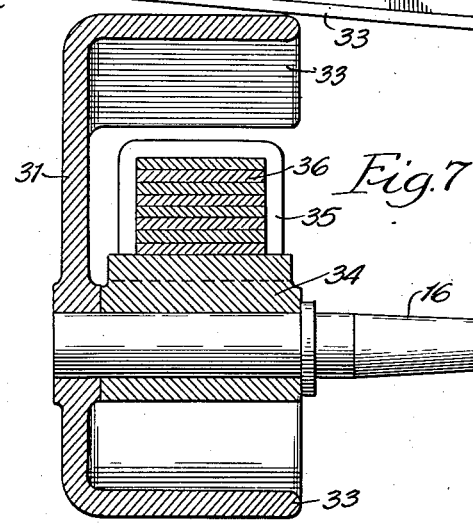
Fig. 7 is a sectional elevation taken on line 7—7 of Fig. 6.

The construction shown in Figs. 5, 6 and 7 is in principle similar to that previously described. In this case, a wheel mounting plate 31 is employed, which is provided with a boss or hub 32 journalled upon the fixed shaft 12, and near the forward end of the plate is located the wheel axle 16. A flange 33 is provided around the edge of the wheel mounting plate to afford the necessary rigidity, and upon the base of the wheel axle 16 is journalled a sleeve 34 provided with U-shaped yoke members 35 which embrace a leaf spring 36 extending fore and aft at an oblique angle above the wheel axle.

The forward end of the leaf spring is secured by a shackle 37 at a point immediately above the fixed axle 12, and the rear end of the leaf spring is secured by a shackle 38 to a traveling block 39 threaded upon an adjusting screw 40 vertically extending in oblique relation and at substantially right angles to the leaf spring, which may be adjusted thereon as indicated in dotted lines in Fig. 5. The lower end of the rod 40 extends through a block or wall 41 and terminates at its lower end in a head 42 which bears against the base of the block or wall 41. The upper end 43 of the rod 40 projects through the housing 20 to the interior of the trailer body and is squared to receive a wrench or other tool for turning the rod to adjust the elevation of the forward end of the leaf spring and thereby rock the wheel mounting upon the fixed axle 12 to regulate the elevation of the trailer in a manner similar to that first described.

In this form of construction the trailer will be supported upon the leaf spring, and the shackle connections afford means for permitting the ends of the spring to accommodate themselves to the adjusting movements as well as to movements occasioned by inequalities in the road surface.

If desired, any one of the forms of construction heretofore described may be supplemented by a suitable form of shock absorbing device, and by way of illustration such a device 44, of conventional form, is shown in Fig. 3, and is actuated through a suitable connection such as a rod 45 leading to the mounting plate so as to partake of the movements thereof. Of course, the present mechanisms may also be provided with suitable brakes or other accessory features, but these form no part of the present invention and need not be described in detail.

In all of the forms of construction above described it is preferred to locate the fixed shaft 12, which affords the pivot for the wheel mounting elements, in advance of the wheels, which facilitates adjustment from points at or near the rear of the trailer and in a position where the parts are more readily accessible, but it will be understood that the particular arrangement shown might be reversed and the pivots for the wheel mounting plates located at the rear instead of in advance of the wheels. It is preferred, however, to support the wheel mountings in advance of the wheels, for the reason that the wheels thus trail behind the points provided for their support instead of being shoved forward, and the arrangement shown affords a more desirable form of mounting and also locates the shaft 12 at a point nearer the center of weight of the trailer than would be possible if the reverse arrangement were utilized.

The arrangement is one which provides in each of the wheel mountings a self-contained unit which may be readily secured in position by merely positioning the wheel and mounting upon the projecting end of the fixed shaft, which shaft not only affords a pivotal support for the wheel mounting but also subserves the functions of a structural element in adding rigidity to the trailer body.

Although the invention in various forms has been described with considerable particularity, it will be understood that the same principle may be utilized in other forms and that it is not the intention, save as indicated in the claim, to limit the invention to the details of construction shown.

I claim:

A vertically adjustable independent wheel spring suspension for the opposite sides of a trailer-type road vehicle body, comprising a pair of substantially triangular shaped plates, common mounting means pivotally connecting an inner end portion of each of said plates to opposite sides of said body for free swinging movement in a vertical plane, manually adjustable spring suspension means connected to a supporting wall of said body and to the outer free end portion of each of said plates, said adjustable means extending through the wall of said body and being operable at will to cause relative movement between said plates on their mounting to vertically adjust an intermediate portion of each plate relative to its pivotal mounting, and a wheel rotatably mounted on said intermediate portion of each plate for movement therewith in adjusting and yieldably supporting said vehicle body.

EDGAR E. WATSON.